(12) United States Patent
Le Pennec et al.

(10) Patent No.: US 8,880,509 B2
(45) Date of Patent: \*Nov. 4, 2014

(54) SYSTEM AND METHOD FOR CACHING DATABASE REPORTS

(71) Applicant: AT&T Intellectual Property I, L.P., Reno, NV (US)

(72) Inventors: Jean-Francois Le Pennec, Nice (FR); Olivier Daude, Nice (FR); Marc Gatignol, Valbonne (FR)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/930,713

(22) Filed: Jun. 28, 2013

(65) Prior Publication Data

US 2013/0290371 A1    Oct. 31, 2013

Related U.S. Application Data

(63) Continuation of application No. 12/613,173, filed on Nov. 5, 2009, now Pat. No. 8,495,056.

(51) Int. Cl.
*G06F 17/30* (2006.01)
(52) U.S. Cl.
CPC ...... *G06F 17/3048* (2013.01); *G06F 17/30457* (2013.01)
USPC ............................ 707/718; 707/721; 707/783

(58) Field of Classification Search
None
See application file for complete search history.

(56) References Cited

U.S. PATENT DOCUMENTS

| | | | |
|---|---|---|---|
| 6,539,382 B1 * | 3/2003 | Byrne et al. | 711/118 |
| 2011/0055202 A1 * | 3/2011 | Heimendinger | 707/721 |

\* cited by examiner

*Primary Examiner* — Anteneh Girma
(74) *Attorney, Agent, or Firm* — Hoffmann & Baron, LLP

(57) ABSTRACT

A method of generating predictive reports includes recording a user identification, a timestamp including a connection date, and a query associated with report requested by a user from a database system for each connection of the user identification to the database system during a predetermined period. A plurality of intervals is defined in the predetermined period. Retrieved are instances of the user identification associated with connections of the user identification to the database system during a threshold number of the plurality of intervals based on a position that a current date occupies in a current interval, such that a position of each connection date in a respective interval is the same as the position that the current date occupies in the current interval. The query is executed to generate the report from the database system on the current date prior to a request for the report from the user.

20 Claims, 4 Drawing Sheets

SYSTEM AND METHOD FOR CACHING DATABASE REPORTS

CROSS REFERENCE TO RELATED APPLICATIONS

This application is a continuation of U.S. patent application Ser. No. 12/613,173 filed on Nov. 5, 2009, which claims priority to French Patent Application No. 0956461 filed on Sep. 21, 2009, the contents of which are incorporated herein by reference in their entirety.

BACKGROUND

1. Field of Technology

The present application relates generally to database reports. More particularly, the present application is directed to a database system and method for predictive database report caching.

2. Brief Discussion of Related Art

To better understand the behavior of networks, users (e.g., network administrators, customers, as well as other users) access reports related to the performance of their networks. Certain web portals provide automated tools that analyze network performance to aid the users in avoiding potential problems, optimizing resources and planning further operations from a centralized location.

Users of such web portal access reports that perform requests (e.g., SQL requests) against one or more databases, such as Oracle databases. Without a cache, each similar request from the same user (or another user) can lead to a duplicate set of SQL queries, requiring large amounts of processing power and time. Caching methods exist to mitigate processing and time expenditures. With existing caching methods, all reports are stored (cached) in a cache for a period of time.

Caching has several drawbacks: size of the cache, number of reports capable of being cached in the cache, and decreasing access performance to reports in the cache as the number of cached reports increases. Although an existing solution that clears the cache frequently alleviates these drawbacks, this solution is nonetheless problematic because the cache is cleared of all reports and then filled up again without an intelligent mechanism, thereby wasting processing power and the time to process SQL queries of reports that may be required after the cache is cleared.

A company named InfoVista™ has developed a web portal solution called VistaPortal that uses a distributed database system called VistaMart, which is an Oracle database system. VistaPortal is used by customers to display data maintained in the VistaMart database system. VistaPortal uses a cache to reduce the time required to display report data of SQL requests addressed to the VistaMart database system.

Specifically, the cache maintains reports to be displayed by VistaPortal for a pre-defined set of VistaPortal user IDs. The cache can be generated on a regular basis using an InfoVista script called "reports.sh" on Unix platforms or "reports.bat" on Windows platforms. The cache also maintains viewed reports until the cache is cleared manually, or periodically via a "crontab" script.

VistaPortal uses the following mechanism to manage its cache. The reports.sh (or reports.bat) script runs the SQL queries against the VistaMart database to build the required reports in the cache of the VistalPortal. The VistaPortal cache includes operating system (OS) files located on VistaPortal that are accessible by a VistaPortal application.

VistaPortal retrieves the reports from the cache when they are requested by the user via the user's VistaPortal ID. If the report is not present in the cache, VistaPortal runs the required SQL queries against the VistaMart database to build the required report in the cache. Running SQL queries from the VistaPortal against the VistaMart database may take a long time and may degrade the VistaPortal user experience.

Users often notice significant delays in displaying reports, especially those requiring complex SQL requests. Further, as different users perform simultaneous requests to the VistaMart database, a user that issues complex SQL requests may significantly degrade the performance of other users. Therefore, improvements in performance for displaying reports would be desirable.

SUMMARY

In accordance with an embodiment, a method of generating predictive reports in a database system is disclosed. The method includes recording a user identification, a timestamp including a connection date, and a query associated with a report requested by a user from the database system for each connection of the user identification to the database system during a predetermined period. A plurality of intervals is defined in the predetermined period based on a pattern of user identification connections to the database system. The method includes retrieving instances of the user identification associated with connections of the user identification to the database system during a threshold number of the plurality of intervals based on a position that a current date occupies in a current interval, such that a position of each connection date in a respective interval is the same as the position that the current date occupies in the current interval. The respective interval and the current interval are the same. The query is executed to generate the report from the database system on the current date associated with a current connection of the user identification to the database system prior to a request for the report from the user.

In accordance with another embodiment, a database system to generate predictive reports is disclosed. The database system includes a processor and a memory. The memory includes instructions that, when executed by the processor, cause the processor to perform certain operations. The operations include recording a user identification, a timestamp including a connection date, and a query associated with a report requested by a user from the database system for each connection of the user identification to the database system during a predetermined period. The operations also include defining a plurality of intervals in the predetermined period based on a pattern of user identification connections to the database system. The operations further include retrieving instances of the user identification associated with connections of the user identification to the database system during a threshold number of the plurality of intervals based on a position that a current date occupies in a current interval, such that a position of each connection data in a respective interval is the same as the position of the current date occupies in the current interval. The respective interval and the current interval are the same. Moreover, the operations include executing the query to generate the report from the database system on the current date associated with a current connection of the user identification to the database system prior to a request for the report from the user.

In accordance with a further embodiment, a computer-readable device is disclosed. The computer-readable device includes instructions that, when executed by a processor, cause the processor to perform certain operations. The operations include recording a user identification, a timestamp including a connection date, and a query associated with a report requested by a user from the database system for each connection of the user identification to the database system during a predetermined period. The operations also include defining a plurality of intervals in the predetermined period based on a pattern of user identification connections to the database system. The operations further include retrieving instances of the user identification associated with connections of the user identification to the database system during a threshold number of the plurality of intervals based on a position that a current date occupies in a current interval, such that a position of each connection data in a respective interval is the same as the position of the current date occupies in the current interval. The respective interval and the current interval are the same. Moreover, the operations include executing the query to generate the report from the database system on the current date associated with a current connection of the user identification to the database system prior to a request for the report from the user.

For a more thorough understanding, reference is made to the following description, taken in conjunction with the accompanying drawings, the scope of which will be defined in the appended claims.

BRIEF DESCRIPTION OF THE DRAWINGS

Some embodiments are illustrated by way of example and not limitation in the figures of the accompanying drawings in which.

DETAILED DESCRIPTION

A database system and method for predictive report caching are disclosed. In the following description, for the purposes of explanation, numerous specific details are set forth in order to provide a thorough understanding of example embodiments. It will be evident, however, to one skilled in the art, that an example embodiment can be practiced without all of the disclosed specific details.

Figure 1:
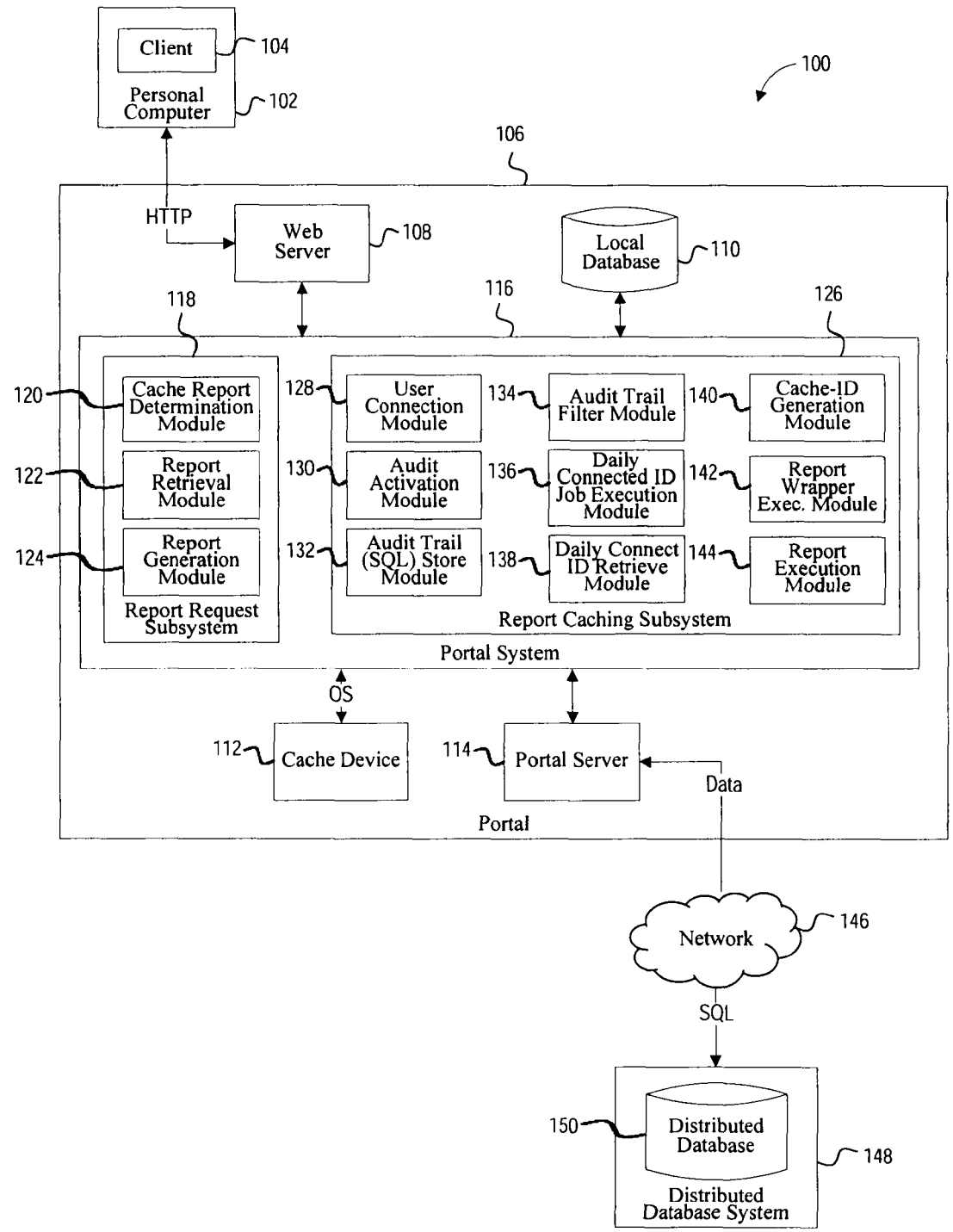
FIG. 1 is a high-level block diagram of a portal-based database system.

FIG. 1 is a high-level block diagram of a portal-based database system 100. The portal-based database system 100 is configured to receive one or more user requests from at least one client to generate one or more reports and to make the reports available to at least one client. The portal-based database system 100 includes at least one personal computer (PC) 102, a portal 106, and a distributed database system 148.

The PC 102 includes a client 104 that is configured to communicate with the portal 106 over a network (not shown) in order to generate the reports and to display the reports. The communication can be accomplished via one or more hypertext transfer protocol (HTTP) messages.

The portal 106 is generally configured to receive one or more user requests for the reports from the at least one PC 102 via the client 104, and to run one or more SQL queries to generate those reports against a distributed database 150, and further to store the generated reports in a cache device 112 for retrieval by the client 104. The portal 106 is further configured to analyze the client's 104 user connection requests for reports over a predetermined period of time in order to generate the reports in a predictive manner that mitigates significant delays in displaying reports by improving the use of the cache device 112.

The portal 106 includes a web server 108, a local database 110, the cache 112, a portal server 114, and a portal system 116. The web server 108 is configured to manage communication sessions between the client 104 of the least one PC 102 that connects to the portal 106. The web server 108 is operably connected to the portal system 116 to connect a user via the client 104 of the at least one PC 102 to the local database 110 and to enable the user to request one or more reports generated against the distributed database 150.

The local database 110 stores tables and views configured to facilitate connection of the user (e.g., user ID/password), generation of requested reports by the user (via the client 104) and analysis of the client's 104 user connection requests over a predetermined period of time for the generation of reports, which mitigates significant delays in displaying reports by improving the use of the cache device 112. The local database 110 can be an Oracle database.

The cache device 112 is configured to generate and maintain a cache associated with the user ID of the user. The cache device 112 can maintain different caches for different user IDs. Each cache can include one or more reports generated (by executing SQL requests) against the distributed database 150.

The portal server 114 is configured to communicate SQL requests to the distributed database system 148 and receive return data from distributed database system 148. The distributed database system 148 can include one or more devices (e.g., servers) to facilitate communication with the distributed database 150 over the network 146. More specifically, the portal server 114 is configured to transmit SQL requests associated with one or more requested reports against the distributed database 150 to the distributed database system 148, and is further configured to receive data from the distributed database system 148 provided by the distributed database 150 in response to the SQL requests.

The portal system 116 is operably coupled to the web server 108, the local database 110, the cache device 112 and the portal server 114. The portal system 116 includes a report request subsystem 118 and a report caching subsystem 126.

The report request subsystem 118 is configured to receive requests for reports via the web server 108 from a user, to generate the requested reports into a cache associated with the user (user ID) in the cache device 112, and to provide the reports to the user (via client 104 of the at least on PC 102) through the web server 108. More specifically, the report request subsystem 118 includes a cache report determination module 120, a report retrieval module 122, and a report generation module 124.

The cache report determination module 120 is configured to receive one or more user requests (associated with user ID) for reports via the web server 108 from at least one PC 102 via its client 104. The cache report determination module 120 is further configured to determine whether the requested reports are in a cache (not shown) of the cache device 112, the cache being associated with the user ID.

If the requested reports are not in the cache as determined by the cache report determination module 120, the report generation module 124 is configured generate the requested reports against the distributed database 150 into the cache associated with the user ID of the cache device 112. The SQL queries necessary to generate the requested reports can be maintained in the cache associated with the user (user ID) of the cache device 112 (e.g., in the "reports.sh") or in the local database 110 also associated with user ID. The report generation module 124 can retrieve the SQL queries from cache device 112 or the local database 110 in order to generate the requested reports.

The report generation module 124 is also configured to store the requested reports in the cache associated with the user ID of the cache device 112. The report generation module 124 is further configured to transmit the requested reports to the user for display (via client 102) through the web server 108.

If the requested reports are in the cache associated with the user ID of the cache device 112 as determined by the cache report determination module 120, the report retrieval module 122 is configured to retrieve the requested reports and further configured to transmit the requested reports to the user for display (via client 102) through the web server 108.

The report caching subsystem 116 is configured to analyze user connections requests of client 104 associated with requests for reports (per user ID) over a predetermined period of time in order to generate the reports in a predictive manner to mitigate significant delays in displaying reports by improving the use of the cache device 112. The report caching subsystem 116 includes a user connection module 128, an audit activation module 130, an audit trail (SQL) store module 132, an audit trail filter module 134, a daily connected ID job execution module 136, a daily connected ID retrieval module 138, a cache for user ID generation module 140, a report wrapper execution module 142, and a report execution module 144.

The user connection module 128 is configured to check the user ID and associated password to connect the user to the local database 110, authorizing the user to use the portal 106 and to perform SQL queries against the distributed database 150. Specifically, the web server 108 can transmit one or more web pages to the client 104 of the at least one PC 102 to obtain the user's user ID/password. The user connection module 128 is configured to check the obtained or received user ID/password against a user database table of the local database 110 (e.g., PPC_GROUPUSER table) that maintains user ID/password combinations for one or more users. For example, fields EXTERNID (user ID) and PASSWORD (password) are shown below in the definition of the example PPC_GROUPUSER table:

| Name | NULL ? | Type |
|---|---|---|
| ID | NOT NULL | NUMBER (38) |
| PARENTID | | NUMBER (38) |
| TYPE | | CHAR(1) |
| EXTERNID | | VARCHAR2(255) |
| NAME | | VARCHAR2(100) |
| PASSWORD | | VARCHAR2(200) |
| GROUPTYPE | | CHAR(1) |
| ISPROTECTED | | CHAR(1) |
| ISACTIVE | | CHAR(1) |
| PASSWORDDATE | | DATE |
| CHANGEPASSWORD | | CHAR(1) |
| LOCKEDUNTIL | | DATE |
| LOCKREASON | | VARCHAR2(255) |
| LOGINFAILURENB | | NUMBER (38) |
| EXPIRESON | | DATE |

The audit activation module 130 is configured to activate an auditing feature or policy in the local database 110 that can audit or record SQL queries (of a report) performed by the user against the distributed database 150 based on the user's user ID in the user table (PPC_GROUPUSER table). For example, the audit activation module 130 can execute the following example PL/SQL script to activate the auditing feature:

```
BEGIN
    DBMS_FGA.add_policy(
        object_schema    => 'VPUSER',
        object_name      => 'PPC_GROUPUSER',
        policy_name      => 'VPUSER_CONNECT_AUDIT',
        audit_condition  => 'TYPE''U''',
        audit_column     => 'EXTERNID',
        statement_types  => 'SELECT');
END;
```

In the above auditing feature activation script, the feature or policy name is VPUSER_CONNECT_AUDIT and the owner is VPUSER. The auditing feature is for ExternId, which in the foregoing example is the connected user ID. The auditing feature is for SQL queries (select) for users (U).

The audit trail (SQL) store module 132 is configured to insert SQL queries (of a report) performed by the user based on the user ID into an audit trail view of the local database 110 (e.g., DBA_FGA AUDIT_TRAIL view). For example, the definition of the DBA_FGA AUDIT_TRAIL view is shown immediately below:

| TIMESTAMP | Date and time of the query in the local database session time zone |
|---|---|
| POLICY_NAME | Name of the Auditing Feature or Policy |
| SQL_TEXT | SQL text of the query |
| SQL_BIND | Bind variable data of the query |

The SQL_TEXT of the DBA_FGA AUDIT_TRAIL view is given by the following example SQL query definition:

```
SELECT          id,
                parentId,
                type,
                externId,
                name,
                password,
                groupType,
                isProtected,
                isActive,
                passwordDate,
                changePassword,
                lockedUntil,
                lockReason,
                loginFailureNb,
                expiresOn
FROM            PPC_GroupUser
WHERE           type=:1
AND             externId=:2
```

It should be noted that the variables type and the externId are bound variables and are stored in the SQL_BIND field of the DBA_FGA AUDIT_TRAIL view. The bound variables (type, externId) can be used to determine connections to the local database 110 by particular users. For example, type=:1 represents a user (U) and externId=:2 represents the user ID of the user connected to the local database 110. In the SQL_BIND field, the bound variables can be stored as: "#1 (1):U #2(13):<user id>".

The audit trail filter module 134 is configured to filter the audit trail view (DBA_FGA AUDIT_TRAIL) into a user audit trail view of the local database 110 (e.g., VPUSER_CONNECT view) based on user ID associated with the connection of the user (user ID) to the local database 110 and a predetermined time period. For example, a VPUSER_CONNECT view is created by selecting the TIMESTAMP and SQL_BIND fields from DBA_FGA_AUDIT_TRAIL view filtered with the auditing or policy feature (POLICY_NAME) in the view (VPUSER_CONNECT_AUDIT), and further filtered with the SQL_BIND field that includes substring "#1(1):U", with the SQL_TEXT field that includes substring: "type=:1", and lastly with a timestamp that is over a predetermined period of time (e.g., one year or shorter from current system time).

The foregoing filtering with the SQL_BIND and SQL_TEXT ensures that the audit records are related to SQL queries of TYPE="U" or user (for user ID connection). For example, the audit trail filter module 134 can execute the following example PL/SQL script to create the VPUSER_CONNECT view:

```
select   substr(sql_bind,instr(sql_bind,':',-1)+1)userid,
         timestamp
from     sys.dba_fga_audit_trail
where    upper(sql_bind) like '#1(1):U%'
and      upper(sql_text) like '%TYPE=:1%'
and      policy_name = 'VPUSER_CONNECT_AUDIT'
and      timestamp >= sysdate-365;
```

The daily connected ID job execution module 136 is configured to invoke modules 138-144 to fill the cache device 112 based on a pattern of user's (user ID) connections to the local database 110 on particular or similar days over the predetermined period. As will be described in greater detail below, the particular or similar days can be determined based on positions that the days occupy in respective intervals of time during the predetermined period. For example, the pattern can be that the user (user ID) connected on Mondays of every week (predetermined interval) or first work day of every month (predetermined interval) and requested a particular report (SQL requests). The intervals of the predetermined period can be determined based on a frequency type of the report, such as monthly, weekly or daily. Other frequency types can be used (e.g., hourly). Therefore, the daily connected ID job execution module 136 is configured to invoke modules 138-144 to fill the cache device 112 with that particular report on that particular day or position within a current interval (e.g., of the week, of the month, or other interval). For example, the daily connected ID cache fill module 136 can schedule for execution the following example PL/SQL program or job on a daily basis:

```
BEGIN
    sys.dbms_scheduler.create_job(
        job_name => "VPUSER".-
        "RUN_DAILY_CONNECTED_USERIDS"',
        job_type => 'STORED_PROCEDURE',
        job_action => 'VPUSER.DAILYCONNECTEDUSERIDS',
        repeat_interval =>
            'FREQ=DAILY;BYHOUR=1;BYMINUTE=0;
            BYSECOND=0',
        start_date => systimestamp at time zone 'GMT',
        job_class => 'DEFAULT_JOB_CLASS',
        auto_drop => FALSE,
        number_of_arguments => 1,
        enabled => FALSE);
    sys.dbms_scheduler.set_job_argument_value(
        job_name => "VPUSER".-
        "RUN_DAILY_CONNECTED_USERIDS"',
        argument_position => 1,
        argument_value => 2);
    sys.dbms_scheduler.enable(
        '"VPUSER"."RUN_DAILY_CONNECTED_USERIDS"');
END;
```

The daily connected ID retrieve module 138 is configured to retrieve a number of connections by user ID and timestamp as a function of the current date from the user audit trail view (VPUSER_CONNECT) and determine connection patterns for each user ID. For example, it could be determined that a particular user ID connected every Monday of consecutive weekly intervals, or every first work day of consecutive monthly intervals, or other connection patterns, such as every last work day of the week or month. For example, the daily connected ID query module 136 can execute the following example PL/SQL program:

```
create or replace procedure
VPUSER.dailyConnectedUserIds(p_threshold integer)
is
type rc is ref cursor;
c_data rc;
v_userid varchar2(255);
begin
    -- get user ids from VPUSER_CONNECT
    open c_data for '
        select      userid
        from        VPUSER.VPUSER_CONNECT
        where       getNumDayInWeek(timestamp) =
                        getNumDayInWeek(sysdate)
        group by    userid
        having count(*) >= p_threshold;
    ';
    loop
        fetch c_data into v_userid;
        exit when c_data%notfound;
        -- run wrapper_reports_sh job for the retrieved user
            id
        sys.dbms_scheduler.set_job_argument_value(
            job_name => '"VPUSER"."REPORTS_WRAPPER_SH"',
            argument_position => 1,
            argument_value => v_userid);
        sys.dbms_scheduler.enable(
            '"VPUSER"."REPORTS_WRAPPER_SH"');
    end loop;
    close c_data;
end;
```

The getNumDayInWeek( ) function of the PL/SQL program set forth above determines the position of a given date in an interval, e.g., a week. Specifically, the getNumDayInWeek( ) receives a date as input and provides the particular day as an integer in the week. For example, getNumDayInWeek ('09/21/2009')=5 or Friday in the pertinent weekly interval. The getNumDayInWeek( ) function is given as follows:

```
create or replace function VPUSER.getNumDayInWeek(p_date
    date) return integer is
begin
    return to_number(to_char(p_date,'D'));
end;
```

The getNumDayInWeek( ) function set forth above is just an example. Other functions to determine positions in given intervals can be developed as desired. For example, a getNumWorkedDayInMonth( ) function receives a date as input for a monthly interval and can return a worked day number (position) of the date in the monthly interval.

The cache-user ID generation module 140 is configured to generate a cache in the cache device 112 for each unique user ID retrieved by the daily connected ID retrieve module 138 by wrapping a "reports_wrapper.sh" script executed by module 142 below. For example, the cache-user ID generation module 140 can execute the following example PL/SQL program:

```
begin
  sys.dbms_scheduler.create_job(
     job_name    => '"VPUSER"."REPORTS_WRAPPER_SH"',
     job_type    => 'EXECUTABLE',
     job_action  =>
           '/opt/InfoVista/Portal/bin/reports_wrapper.sh',
     start_date  => systimestamp at time zone 'GMT',
     job_class   => 'DEFAULT_JOB_CLASS',
     auto_drop   => FALSE,
     number_of_arguments => 1,
     enabled     => FALSE);
end;
```

The report wrapper execution module 142 is configured to execute a "reports_wrapper.sh" script installed in a location (e.g., directory) of the portal system 116. For example, "reports_wrapper.sh" wraps "reports.sh" script executed by the report execution module 144 and is given as follows:

```
/opt/InfoVista/Portal/bin/reports.sh -l admin -p
<password> -firstonly -fullscreen -u $1 -verbose >>
/opt/InfoVista/ShadowUsers/log/$1.log
```

The report execution module 144 is configured to generate the report for each unique user ID into the cache associated with the user ID. Specifically, the report execution module 144 can execute the "reports.sh" script to generate the report for the user ID in the cache device 112. The parameter $1 is the user ID passed by the cache-ID generation module 140 (REPORTS_WRAPPER_SH) into which the report is stored.

Figure 2:
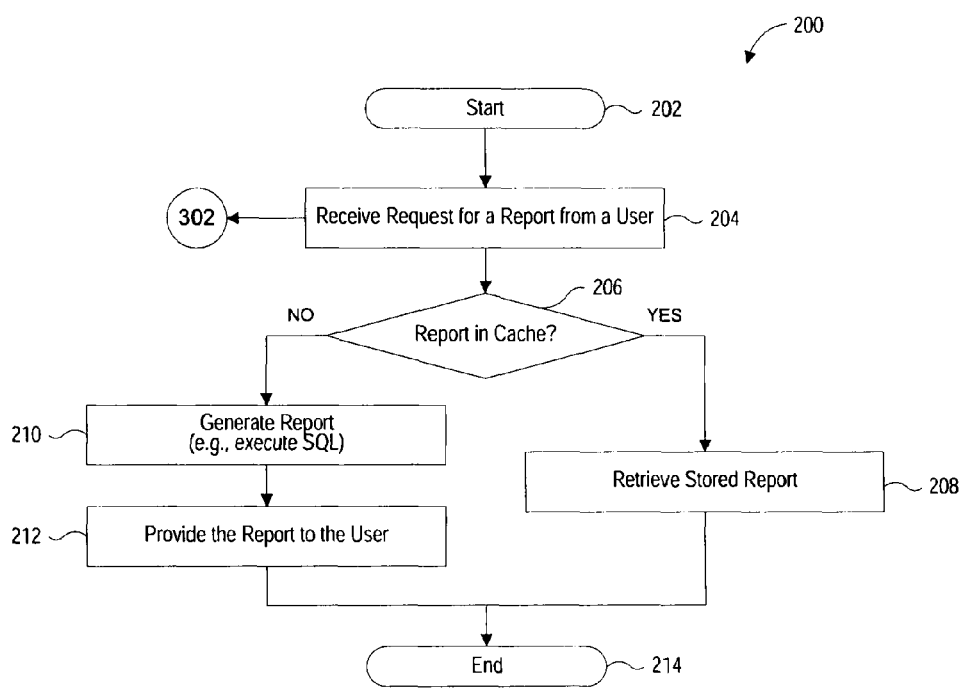
FIG. 2 is a flowchart of an example method for requesting a report in accordance with FIG. 1.

FIG. 2 is a flowchart of an example method 200 for requesting a report in accordance with FIG. 1. The method 200 starts at operation 202. It is assumed that the user has been authorized to access the local database 110 via user ID/password. At operation 204, a request for a report is received from the user. For example, the request can be received by the cache report determination module 120 from the client 104 via the web server 108, as shown in the system 100 of FIG. 1. The connection and the request are passed to operation 302 of FIG. 3 for report caching purposes described herein.

At operation 206, a determination is made whether the request report is in a cache. For example, the cache report determination module 120 can determine whether the requested report is stored in the cache associated with the user's user ID in the cache device 112.

If it is determined at operation 206 that the report is in the cache, the method continues at operation 208 to retrieve the report from the cache device 112 (e.g., from cache associated with the user ID). For example, the report retrieval module 122 can retrieve the report from the cache device 112 and the web server 108 can transmit the report to the user via the client 104 for display. Thereafter the method ends at operation 212.

If it is determined at operation 206 that the report is not in the cache, the method continues at operation 210 to generate the report into the cache of the cache device 112. For example, the report generation module 124 can execute SQL queries to generate the report into the cache device 112. The report can be stored into the cache of the cache device 112 that is associated with the user ID of the user. At operation 212, the report is provided to the user. For example, the web server 108 can transmit the report generated by the report generation module 124 to the user via the client 104 for display. Thereafter the method ends at operation 214.

Figure 3:
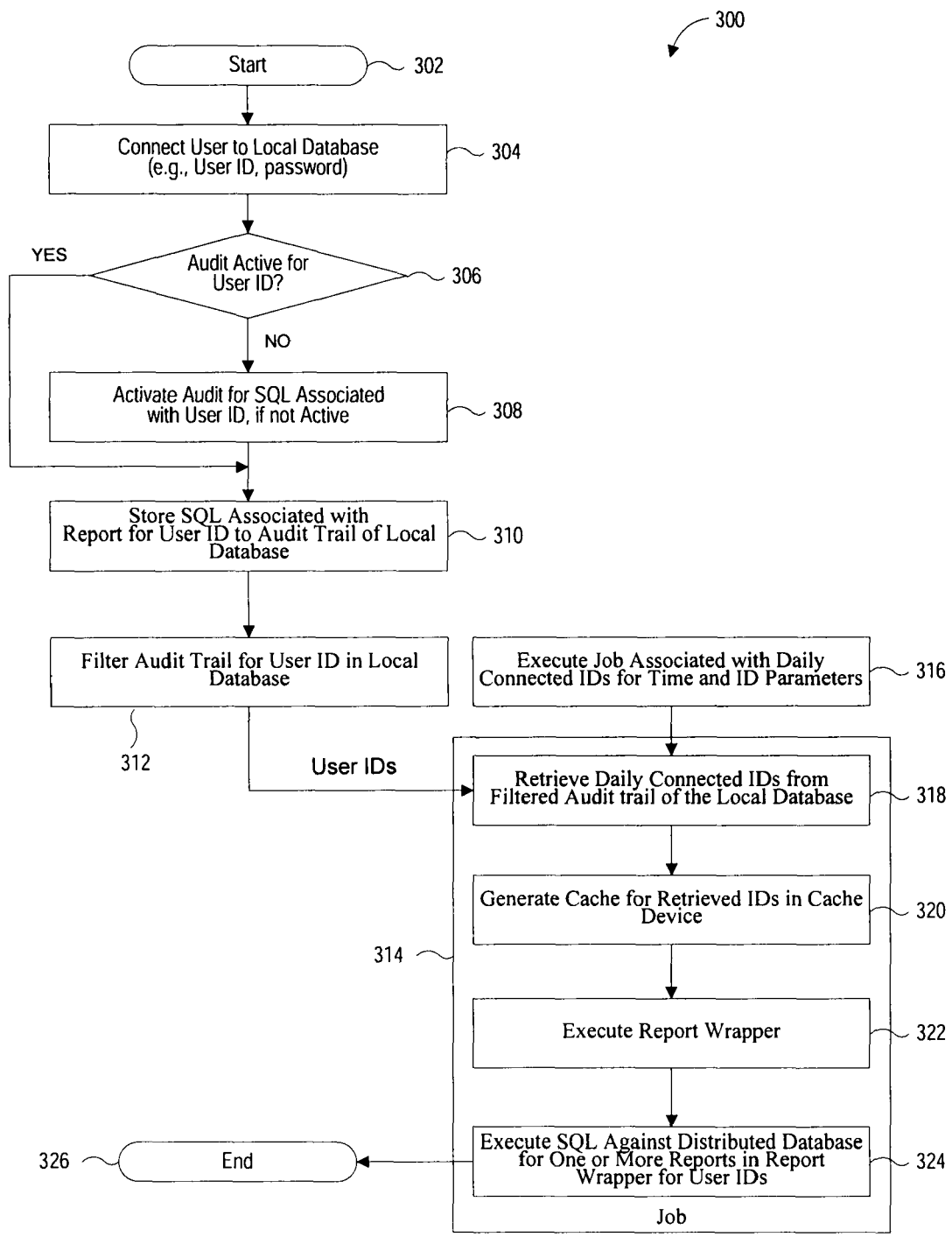
FIG. 3 is a flowchart of an example method for caching reports in a predictive manner in accordance with FIG. 1.

FIG. 3 is a flowchart of an example method 300 for caching reports in a predictive manner in accordance with FIG. 1. The method 300 starts at operation 302. At operation 304, the user connects to the local database 110. For example, the user connection module 128 can connect a user to the local database 110 via user ID/password by checking or verifying the user ID/password against the user database table (e.g., PPC_GROUPUSER).

At operation, 306, a determination is made as to whether an auditing feature or policy is activated for the user ID. For example, the audit activation module 130 can determine whether auditing feature or policy for user ID is activated on the local database 110. The auditing feature or policy enables recordation of SQL requests associated with reports performed by the user (user ID) against the distributed database 150.

If it is determined that the auditing feature or policy is activated at operation 306, the method continues at operation 310, as described below. However, if it is determined that the auditing feature or policy is not activated at operation 306, the method continues at operation 308, where the auditing feature or policy is activated to record SQL requests of reports performed by the user (user ID) against the distributed database 150.

At operation 310, the SQL requests associated with a report for the user ID are stored to an audit trail of a local database. For example, the audit trail (SQL) store module 132 can store the SQL requests of the report for the user ID to DBA_F-GA_AUDIT_TRAIL view of the local database 110.

At operation 312, the audit trail of operation 310 is filtered for the user ID over a predetermined period of time (e.g., one year or shorter) by generating a user audit trail (e.g., for the user ID). For example, the audit trail filter module 134 can filter the view DBA_FGA_AUDIT_TRAIL for user ID into a view VPUSER_CONNECT of the local database 110. Specifically, the TIMESTAMP and SQL_BIND fields of DBA_FGA_AUDIT_TRAIL view can be filtered for user ID over the predetermined time period.

At operation 316, job 314 is executed for connected IDs with time and ID threshold parameters. Operation 314 is a job defined by constituent operations 318-324 to fill the cache device 112 with one or more repots for the connected user IDs at the time (e.g., daily, hourly) for the ID threshold over a past predetermined period of time (e.g., ID threshold=2). For example, the daily connected ID job execution module 136 can execute the job 314.

At operation 318, daily connected IDs to the local database are retrieved. It is noted that the user IDs from operation 312 are accounted for at operation 318. The daily connect ID retrieval module 138 can execute operation 318. Specifically, at the specified time the user IDs that connected to the local database 110 greater than the ID threshold number of times over past predetermined periods are retrieved as a function of the current date from the view (VPUSER_CONNECT). For example, it could be determined that a particular user ID connected on Mondays of every week, or on the first work day of every month for the past two or more intervals (e.g., weeks, months) to the local database 110.

At operation 320, a cache for each retrieved user ID is generated in the cache device 112. For example cache-ID generation module 140 can generate the cache for each retrieved user IDs in the cache device 112.

At operation 322, a report wrapper is executed. For example, the report wrapper execution module 142 can execute the report wrapper. As described herein, the report wrapper execution module 142 can execute the "reports wrapper.sh" script that is installed in a particular location (e.g., directory) of the portal system 116.

At operation 324, a report (wrapped by the report wrapper) is executed for each user ID. For example, the report execution module 144 can execute the report ("reports.sh" script) for each user ID. Specifically, SQL queries of the report are executed against the distributed database 150 for each user ID. The reports are stored into the cache device 112 for retrieval by users when they connect via the at least on PC 102 to the local database 110. The method 300 ends at operation 326.

Figure 4:
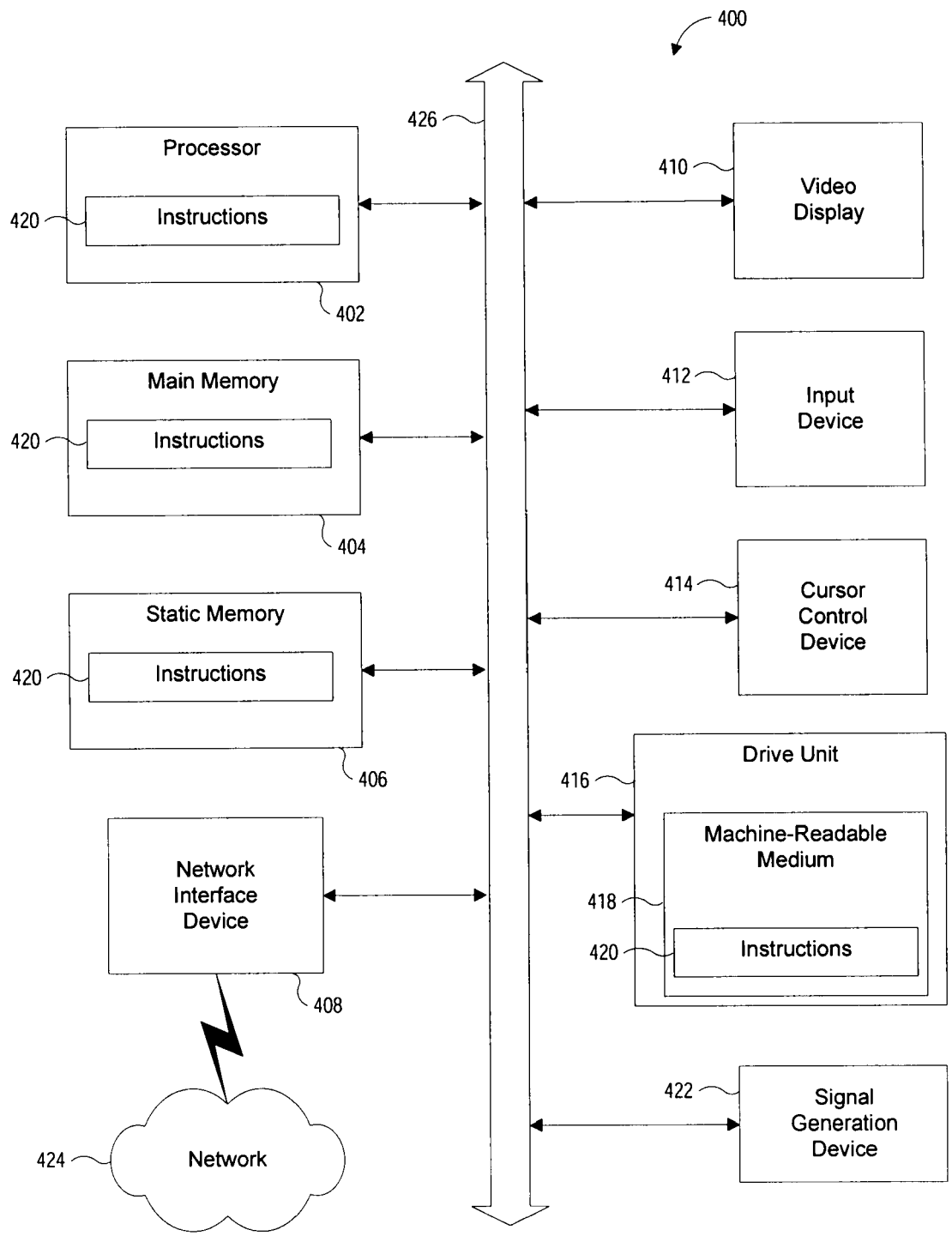
FIG. 4 is a block diagram of a general computer system.

FIG. 4 is a block diagram of a general computer system 400. The computer system 400 can include a set of instructions that can be executed to cause the computer system 400 to perform any one or more of the methods or computer based functions disclosed herein with respect to FIGS. 1-3. The computer system 400 or any portion thereof, may operate as a standalone device or may be connected, e.g., using a network 424, to other computer systems or devices disclosed herein with respect to FIGS. 1-3. For example, the computer system 400 may include or be included within any one or more of the systems, computers, portals, servers, databases, database systems, or any other devices disclosed herein with respect to FIGS. 1-3.

In a networked deployment, the computer system 400 may operate in the capacity of a server or a client machine in a server-client network environment, or a peer machine in a peer-to-peer (or distributed) network environment. The computer system 400 can also be implemented as or incorporated into various devices, such as a personal computer (PC), a tablet PC, a personal digital assistant (PDA), a web appliance, a communications device, a mobile device, a wireless telephone, a control system, a network router, switch or bridge, a portal, a database system or any other machine capable of executing a set of instructions (sequential or otherwise) that specify actions to be taken by that machine. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics-processing unit (GPU), or both. Moreover, the computer system 400 can include a main memory 404 and a static memory 406 that can communicate with each other via a bus 426. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 422, such as a speaker or remote control, and a network interface device 408.

In a particular embodiment, as depicted in FIG. 4, the disk drive unit 416 may include a machine or computer-readable medium 418 in which one or more sets of instructions 420 (e.g., software) can be embedded. Further, the instructions 420 may embody one or more of the methods or logic as described herein with reference to FIGS. 1-3. In a particular embodiment, the instructions 420 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. The term "tangible computer-readable medium" does not encompass a signal propagation media, such as a copper transmission cable, optical transmission fiber, or wireless transmission media. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, a system and method of predictive report caching in a database system have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method of generating predictive reports in a database system, the method comprising:

recording, by a processing device, a user identification, a timestamp and a query, the user identification associated with a user, the timestamp including a connection date, the query being associated with a report requested by the user from the database system for each connection to the database system associated with the user identification during a predetermined period;

defining, by the processing device, a plurality of intervals in the predetermined period based on a pattern of connections to the database system associated with the user identification;

retrieving, by the processing device, instances of the user identification associated with connections to the database system during a threshold number of the plurality of intervals based on a position that a current date occupies in a current interval, such that a position of each connection date in a respective interval is the same as the position that the current date occupies in the current interval, the respective interval and the current interval being the same; and executing, by the processing device, the query to generate the report from the database system on the current date associated with a current connection of the user identification to the database system prior to a request for the report from the user.

2. The method of claim 1, further comprising:

receiving the user identification and an associated password from the user; and connecting the user identification to the database system in response to verifying the user identification and the password.

3. The method of claim 1, further comprising:

determining whether auditing is activated for the user identification; and activating an audit trail if auditing has not been activated to enable recording of the user identification, the timestamp and the query in response to a connection to the database system associated with the user identification.

4. The method of claim 3, further comprising filtering the audit trail based on the user identification.

5. The method of claim 1, further comprising scheduling a daily job associated with generating the report based on an execution time and the threshold number.

6. The method of claim 1, further comprising:

generating a cache associated with the user identification in a cache device of the database system; and storing the report generated in the cache.

7. The method of claim 1, wherein defining the plurality of intervals further comprises determining the intervals based on how frequently the report is generated.

8. A database system to generate predictive reports, the database system comprising:
   a processor; and
   a memory to store instructions that, when executed by the processor, cause the processor to perform operations comprising:
      recording a user identification, a timestamp and a query, the user identification associated with a user, the timestamp including a connection date, the query being associated with a report requested by the user from the database system for each connection to the database system associated with the user identification during a predetermined period;
      defining a plurality of intervals in the predetermined period based on a pattern of connections to the database system associated with the user identification;
      retrieving instances of the user identification associated with connections to the database system during a threshold number of the plurality of intervals based on a position that a current date occupies in a current interval, such that a position of each connection date in a respective interval is the same as the position that the current date occupies in the current interval, the respective interval and the current interval being the same; and
      executing the query to generate the report from the database system on the current date associated with a current connection of the user identification to the database system prior to a request for the report from the user.

9. The database of claim 8, wherein the operations further comprise:
   receiving the user identification and an associated password from the user; and
   connecting the user identification to the database system in response to verifying the user identification and the password.

10. The database system of claim 8, wherein the operations further comprise:
   determining whether auditing is activated for the user identification; and
   activating an audit trail if auditing has not been activated to enable recording of the user identification, the timestamp and the query in response to a connection to the database system associated with the user identification.

11. The database system of claim 10, wherein the operations further comprise filtering the audit trail based on the user identification.

12. The database system for predictive report caching of claim 8, wherein the operations further comprise scheduling a daily job associated with generating the report based on an execution time and the threshold number.

13. The database system of claim 8, wherein the operations further comprise:
   generating a cache associated with the user identification in a cache device of the database system; and
   storing the report generated in the cache.

14. The database system of claim 8, wherein the plurality of intervals is further based on how frequently the report is generated.

15. A tangible computer-readable medium storing instructions that, when executed by a processor, cause the processor to perform operations comprising:
   recording a user identification, a timestamp and a query, the user identification associated with a user, the timestamp including a connection date, the query being associated with a report requested by the user from the database system for each connection to the database system associated with the user identification during a predetermined period;
   defining a plurality of intervals in the predetermined period based on a pattern of connections to the database system associated with the user identification;
   retrieving instances of the user identification associated with connections to the database system during a threshold number of the plurality of intervals based on a position that a current date occupies in a current interval, such that a position of each connection date in a respective interval is the same as the position that the current date occupies in the current interval, the respective interval and the current interval being the same; and
   executing the query to generate the report from the database system on the current date associated with a current connection of the user identification to the database system prior to a request for the report from the user.

16. The tangible computer-readable medium of claim 15, wherein the operations further comprise:
   retrieving the user identification and an associated password from the user; and
   connecting the user identification to the database system in response to verifying the user identification and the password.

17. The tangible computer-readable medium of claim 15, wherein the operations further comprise:
   determining whether auditing is activated for the user identification; and
   activating an audit trail if auditing has not been activated to enable recording of the user identification, the timestamp and the query in response to a connection to the database system associated with the user identification.

18. The tangible computer-readable medium of claim 17, wherein the operations further comprise filtering the audit trail based on the user identification.

19. The tangible computer-readable medium of claim 15, wherein the operations further comprise scheduling a daily job associated with the generating of the report based on an execution time and the threshold number.

20. The tangible computer-readable medium of claim 15, wherein the operations further comprise:
   generating a cache associated with the user identification in a cache device of the database system; and
   storing the report generated in the cache.

* * * * *